Figure 1:
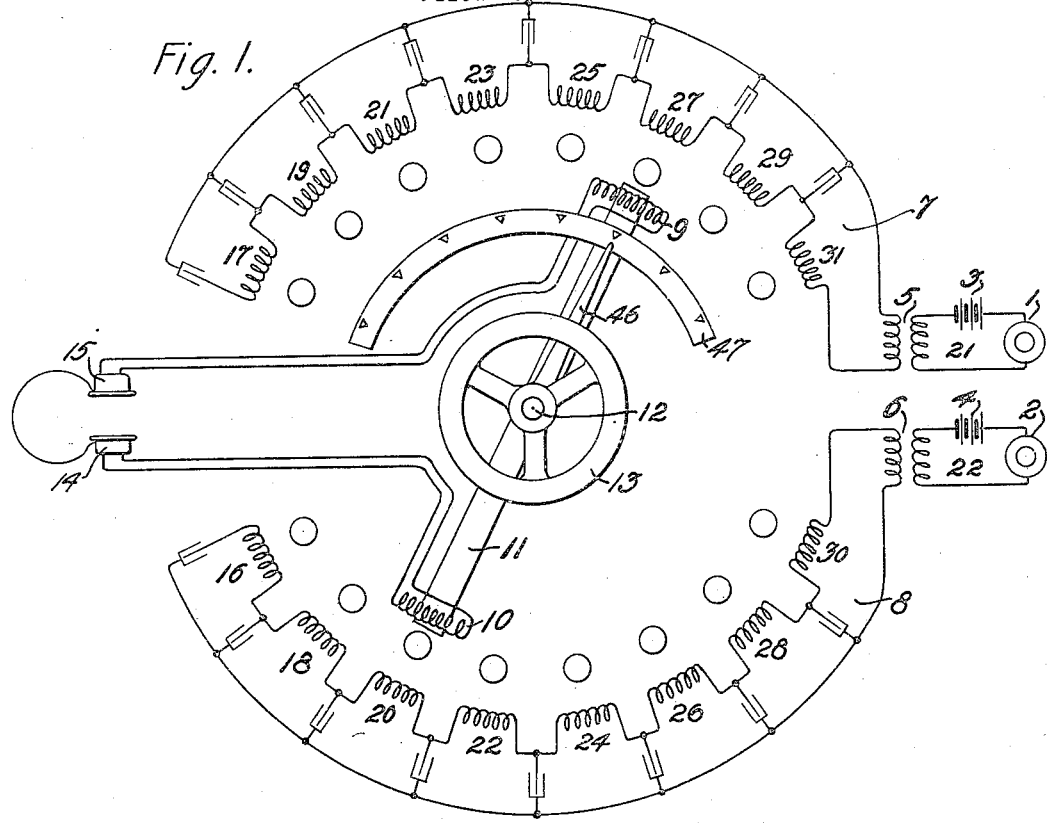

May 17, 1927.

J. MILLS 1,628,992

SYSTEM FOR LOCATION OF A SOURCE OF SOUND VIBRATIONS

Filed Dec. 24, 1920

Inventor:
John Mills
by Joel R. Palmer
Att'y.

Patented May 17, 1927.

1,628,992

UNITED STATES PATENT OFFICE.

JOHN MILLS, OF WYOMING, NEW JERSEY, ASSIGNOR TO WESTERN ELECTRIC COMPANY, INCORPORATED, OF NEW YORK, N. Y., A CORPORATION OF NEW YORK.

SYSTEM FOR LOCATION OF A SOURCE OF SOUND VIBRATIONS.

Application filed December 24, 1920. Serial No. 432,970.

This invention relates to an improvement in the compensating means used in systems for locating a source of sound vibrations.

The object of this invention is to provide an adjustable electromagnetic coupling between an electrical artificial line cooperating with electrical sound vibration transmitters and electrical receiving or comparing elements, the purpose of said electromagnetic coupling being to give a more flexible gradation in compensation and hence a more accurate direction indication of the source of sound than has been possible previously.

Heretofore where it was desired to locate a source of sound vibrations, a plurality of electrical sound transmitters, usually used in pairs, have been employed and the current variations set up in the transmitter circuits by said sound vibrations conveyed to receiving or comparing elements such as telephonic receivers or visual detecting means through an adjustable combination of series inductance and shunt capacity. Such a combination is used to adjust the phase of the transmitted current variations in one transmitter circuit relative to current variations in the other transmitter circuit so that the sound produced electrical variations in the circuits reach the receiving or comparing elements synchronously. The adjustable compensating means is so graduated or calibrated as to indicate the direction of the source of sound by its point of adjustment for current impulse synchronism. The various units or sections of the compensator are terminated in contact blocks or electrical switching terminals of some sort and adjustment as to the amount of compensation in circuit is effected by operating a switching mechanism cooperable therewith. With such apparatus, it is necessary to interpolate between steps in compensation when an exact balance is not obtained on any particular step.

To eliminate the necessity of interpolation in adjustment as above mentioned and the time consumed thereby, and also to eliminate to a great extent the annoying electrical fluctuations attendant on operation of switching contacts, this invention provides a means of adjustably and electromagnetically coupling the transmitters with the receiving elements of the system. This is accomplished through the medium of an artificial line in such relation to said coupling that the transition from section to section of said compensator is gradual and the increments of compensation between sections are substantially proportional to the increments in movement of the coupling member. Thus, interpolation may be eliminated and accuracy of adjustment of compensation and accompanying accuracy of direction determination of a source of sound vibrations secured.

A preferred embodiment of this invention is disclosed in the accompanying illustrative drawings in which Figure 1 discloses a diagrammatic circuit and apparatus connected or coupled in accordance with the features of this invention. Also, it will be noted that the electrical compensator is shown in circular form, which is the preferred arrangement, but other arrangements may be used, giving the same combination of parts.

Figure 2:
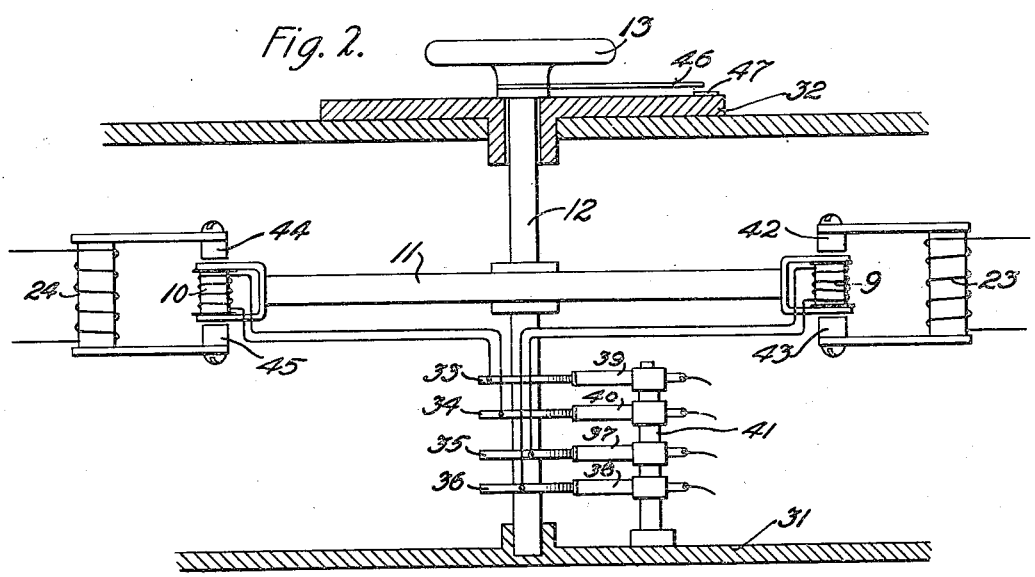

Figure 2 is a cross section side view of a portion of the apparatus. Also, it illustrates the manner of associating the coupling member with the transmitting circuit and of maintaining electrical connection with the coupling member in whatever position it may be located. As in Figure 1, this illustration refers to the circular arrangement of the artificial line.

In detail, the operation of this invention contemplates a plurality of means for the conversion of sound vibrations into electrical impulses. These converging means may take the form of telephonic transmitters 1, 2 connected respectively in series circuits consisting of sources of electrical energy 3, 4 and the primary windings of induction coils 5, 6. The electrical impulses set up in the primary windings of induction coils 5, 6 are electromagnetically repeated into the secondary windings of said induction coils and are transmitted therefrom into artificial lines 7, 8 composed of series inductance and shunt capacity elements. Cooperative with said inductance elements are detecting or exploring coils 9, 10, one for each artificial line, said exploring elements being electromagnetically coupled adjustably with said inductance elements in such a manner that the increment in phase shift occasioned by total artificial line in circuit upon a slight movement of coils 9 and 10 is substantially proportional to the change in position of the said exploring coils. The exploring or detecting coils 9, 10 are fixedly attached to a diametral arm 11 attached to shaft 12 which may be rotated by hand wheel 13. The exploring or detecting coils 9, 10 are respectively connected electrically to receiving or comparing means 15 and 14 illustrated as telephonic receivers in the diagram. Thus, assuming sound vibrations to come from some unknown source, these vibrations impinging on the sound converting means 1, 2 would set up electrical impulses in the circuits, as shown, and unless this sound was exactly equidistant from each of the said means 1 and 2, the electrical impulses in one circuit would have a slight electrical lead over those in the other circuit. To synchronize the impulses in the two circuits hand wheel 13 may be rotated carrying the attached members 9, 10, 11, 12 starting, for example, with exploring coil 9 in the magnetic field generated by inductance element 17 and exploring coil 10 in the magnetic field generated by inductance element 30. These coils 9 and 10 would be moved in a clockwise direction over arcs of a circle and thus through the magnetic fields of the other inductance elements in circuit, such as 19, 21, 23, 25, etc., cooperative with coil 9, and 28, 26, 24, 22, etc., cooperative with coil 10. This motion is continued until the electrical impulses conveyed to the receiving or comparing means 15 and 14 by mutual inductance come into synchronism, indicating that the amount of phase difference in the electrical impulses transmitted from the members 1 and 2 has been compensated by the relative amounts of artificial lines 7 and 8 electromagnetically incorporated in the circuits leading to the receiving or comparing means. The shaft 12 carries a pointer 46 operating over a dial 47, which dial is calibrated or graduated in units to indicate the direction of the source of sound.

Referring to Fig. 2, there is shown in detail the construction of the electromagnetic elements of the artificial lines, before mentioned, and the method of bringing the detecting or exploring coils 9 and 10 into cooperation with the magnetic fields established by these inductive elements. The structure of electromagnetic elements, such as 23, 24, consists of U-shaped cores having respective pole pieces 42, 43 and 44, 45. Rotating between the sets of these pole pieces are the exploring or detecting coils 9 and 10 with their respective windings connected to slip rings 35, 36 and 33, 34 attached to shaft 12 and insulated therefrom. Cooperative with the said slip rings are brushes 37, 38 and 39, 40 whose terminals lead to the receiving or comparing means 15 and 14, as before mentioned. These brushes may be retained rigidly in alignment by being attached to an insulating post 41. The rotating member of this apparatus is disclosed as journaled in a bottom plate 31 and guided by a bearing in a top plate 32.

What is claimed is:

1. A system for determining the direction of a source of wave energy comprising transmitting circuits including a pair of devices for converting the wave energy into electrical impulses, said devices being spaced apart, a pair of receivers, a plurality of artificial lines associated one with each of said devices, and means including coils electromagnetically coupled to said lines and movable along the same, said means having said receivers associated therewith and by its point of adjustment for current impulse synchronism in said receivers indicating the direction of the source of sound.

2. An electrical compensator comprising an artificial line, said line comprising inductances and capacities, and means including a coil electromagnetically coupled to said line through the instrumentality of said inductances, said coil being movable along said line to vary the position at which it is coupled to said artificial line; whereby a current flowing in said line induces a voltage in said coil which may be continuously shifted in phase.

3. An electrical compensator comprising a pair of artificial electrical lines, each consisting of series inductances and shunt capacities; and a pair of secondary coils one coupled to each of said lines, said coils being movable along said lines to vary the position at which they are coupled to said lines.

4. In a system for determining the location of a source of sound vibrations, the combination of a pair of devices for converting sound vibrations into electrical impulses, said devices being spaced apart, an adjustable electrical compensating means connected to act upon the electrical impulses so produced, said compensating means comprising artificial lines in circuit with said devices, means including coils inductively associated with the inductance elements of said lines and movable along the same, receivers electrically connected to said coils to receive compensated electrical impulses from said converting means, said latter means by its point of adjustment for current impulse synchronism in said receivers indicating the direction of the source of sound.

5. In a system for determining the location of a source of sound vibrations, the combination of a plurality of means for converting sound vibrations into electrical impulses, said means being spaced apart, an artificial line cooperative with each sound converting means said line comprising series inductance elements and shunt capacity elements, detecting coils coupled by mutual induction with said inductance elements and adjustable as to position relative thereto, and receiving means electrically connected to each of said detecting coils for determining the proper adjustment of said coils for synchronism of current impulses at said receiving means, the direction of said source of sound bearing a fixed relation of proper adjustment of said coupled coil.

In witness whereof, I hereunto subscribe my name this 21st day of December A. D., 1920.

JOHN MILLS.